United States Patent [19]

Maruyama et al.

[11] Patent Number: 5,555,051
[45] Date of Patent: Sep. 10, 1996

[54] BACK-FOCUS ADJUSTING DEVICE FOR A VIDEO CAMERA

[75] Inventors: Kenichi Maruyama, Okazaki; Haruo Maeda, Tsushima; Eiji Togawa, Nagoya, all of Japan

[73] Assignee: Elmo Co., Ltd., Nagoya, Japan

[21] Appl. No.: 426,083

[22] Filed: Apr. 21, 1995

[30] Foreign Application Priority Data

Aug. 10, 1994 [JP] Japan ................................ 6-210597

[51] Int. Cl.$^6$ ........................................................ G03B 1/18
[52] U.S. Cl. ............................................ 354/195.1; 354/286
[58] Field of Search .................................... 354/195.1, 286

[56] References Cited

U.S. PATENT DOCUMENTS 5,475,457  12/1995  Tanaka .

Primary Examiner—Monroe H. Hayes
Attorney, Agent, or Firm—Koda and Androlia

[57] ABSTRACT

To set a distance between a lens mounting surface of a lens mount and a image pickup element for a back-focus of a interchangeable lens, the video camera comprises two guide pins fixed inside a front panel of a camera body parallel to an optical axis of a lens, said front panel which the lens mount is fixed in, a carrier supported by the two guide pins to move parallel to the optical axis, said carrier to which the image pickup element is fixed, a spring provided between the carrier and the front panel of the camera body to bias the carrier in such a direction that the carrier separates from the lens mount, a screw shaft rotatably assembled on the camera body by a holder to move parallel to the optical axis of the lens, said screw shaft having one end connected with the carrier and the other end on which an adjusting ring is screwed, and an opening formed in the camera body.

When the ring is rotated by a finger or a tool being inserted in the camera body through the opening, the screw shaft moves back and forth, so that the carrier moves parallel to the optical axis of the lens along the guide pins. As a result, a change occurs in The distance between a lens mounting surface of the lens mount and the image pickup element.

5 Claims, 2 Drawing Sheets

BACK-FOCUS ADJUSTING DEVICE FOR A VIDEO CAMERA

BACKGROUND OF THE INVENTION

This invention relates to a back-focus adjusting device for a video camera. In a conventional video camera which is provided with an interchangeable lens, when mounting the lens on a camera body, a distance between a lens mounting surface of a lens mount and an image pickup element built in a camera body needs to be set for a back-focus of the lens in order to achieve a required resolution.

Namely, firstly, the image pickup element is fixed in the camera body, while the lens mount is assembled in the camera body in such manner as to be movable back and forth. Secondly, with the lens mounted on the lens mount, the lens mount is rotated to move back and forth along the optical axis. Thirdly, the lens mount is fixed with a set screw in such a position that a clear image of an object is formed on the image pickup element through the lens.

As mentioned above, according to the conventional video camera, the lens mount must be rotated with the lens mounted thereon to adjust the back focus of the lens. In particular, the lens which has a motor built therein to drive an iris diaphragm is heavy and bulky. Further, in such a lens a cord is pulled out from the motor. Thus, it is extremely troublesome to adjust a distance to which the lens mount moves by a minute rotation of lens.

Further, because video surveillance cameras are usually installed at corners of ceilings, or places which are difficult to operate the lens mounts, it is extremely difficult to adjust a back-focus of the lens by rotating the lens and the lens mounts, with the video surveillance camera installed at the corner of the ceiling or the like.

SUMMARY OF THE INVENTION

It is an object of the present invention to provide a back-focus adjusting device for a video camera, which device is easy to operate.

To attain the above object, there is provided in the invention the back-focus adjusting device comprising:

two guide pins fixed inside a front panel of a camera body parallel to an optical axis of a lens, said front panel in which a lens mount is fixed, a carrier supported in the camera body by the two guide pins to move parallel to the optical axis, said carrier to which an image pickup element is fixed, said carrier biased by a spring in such a direction that the carrier separates from the lens mount, said spring provided between the carrier and the front panel of the camera body, a screw shaft rotatably assembled on the camera body by a holder to move parallel to the optical axis of the lens, said screw shaft having one end connected with the carrier and other end on which an adjusting ring is screwed, said adjusting ring which is rotatable and prevented from slipping out from the screw shaft by the holder, and an opening formed in the camera body, said opening to which the adjusting ring is provide adjacent, so that the adjusting ring can be operated from outside the camera body.

The device is characterized in that the adjusting ring is biased toward the holder by a spring.

The device is characterized in that the lens mount and each one end of the both guide pin are securely attached inside the front panel of the camera body by an insert moulding.

The device is characterized in that the both guide pins are located symmetric with respect to the optical axis of the lens.

According to the back-focus adjusting device of the present invention, with rotation of the adjusting ring, the screw shaft moves back and forth, while the carrier, connected with the screw shaft, moves parallel to the optical axis of the lens along the guide pins. As a result, a change occurs in the distance between the lens mounting surface of the lens mount and the image pickup element fixed to the carrier.

Thus, by rotating the adjusting ring by a tool or a finger being inserted in the camera body through the opening, the distance between the lens mounting surface of the lens mount and the image pickup element fixed to the carrier can be set for the back-focus of the lens. Because the lens mount need not be rotated integral with the lens, it is simple and easy to adjust the back-focus of the lens in a video camera.

Also, the adjusting ring is biased toward the holder by a spring, so that the screw shaft moves back and forth without rattling along the optical axis according to a rotation amount of the ring.

Further, the lens mount and the each one end of the guide pins are securely attached by an insert moulding. As a result, not only is a structure of the camera body simple, but also the lens mount and the guide pins need not be assembled on the camera body. Thus, a production cost of the video camera can be sharply reduced.

Further, the both guide pins are located symmetric with respect to the optical axis of the lens.

Thus, the carrier having the image pickup element fixed thereto can be supported on the camera body with such a high accuracy that the carrier moves parallel to the optical axis of the lens.

DETAILED DESCRIPTION OF THE PREFERRED EMBODIMENTS

Figure 1:
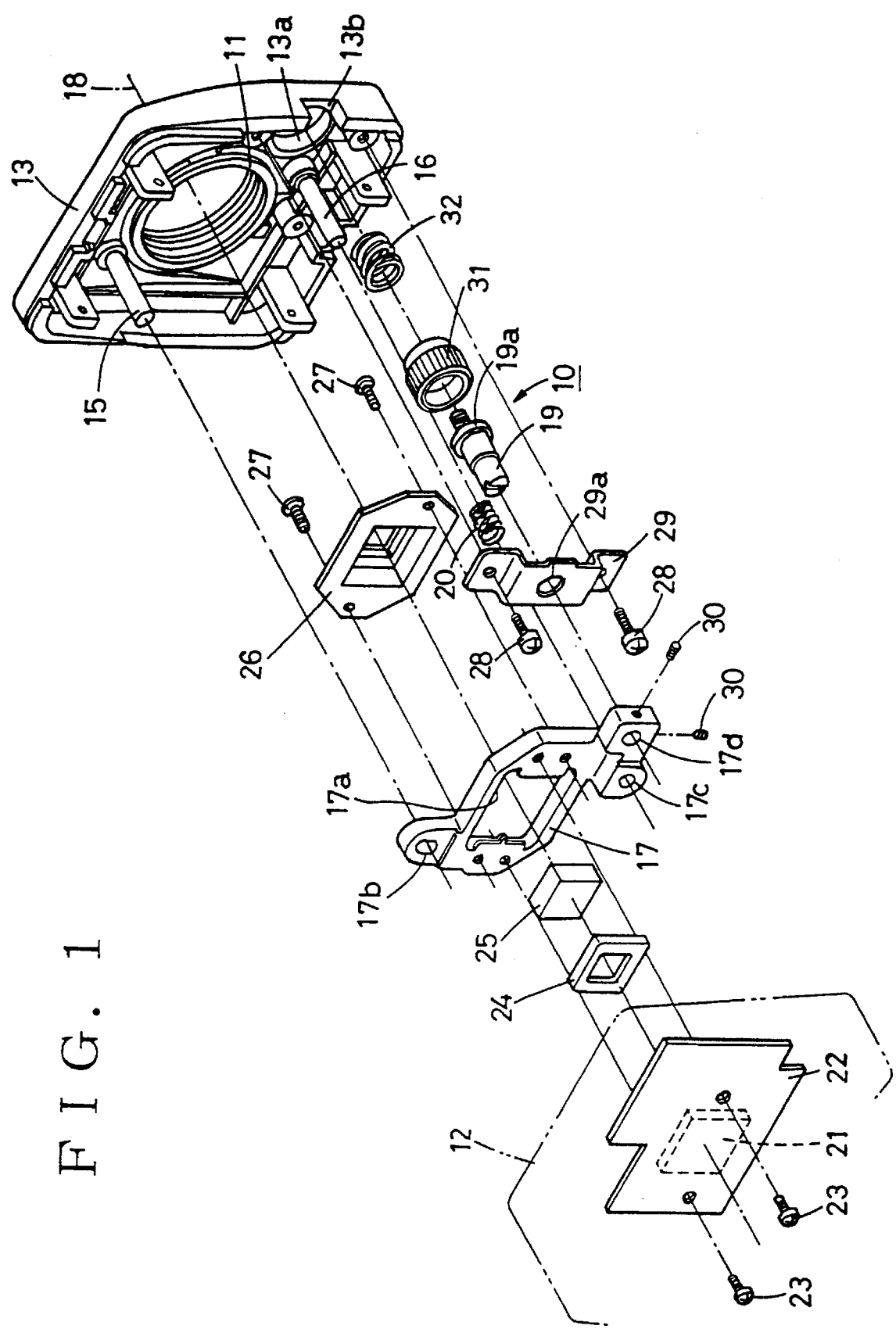
FIG. 1 is an exploded perspective view showing a back-focus adjusting device for a video camera according to the present invention.
Figure 2:
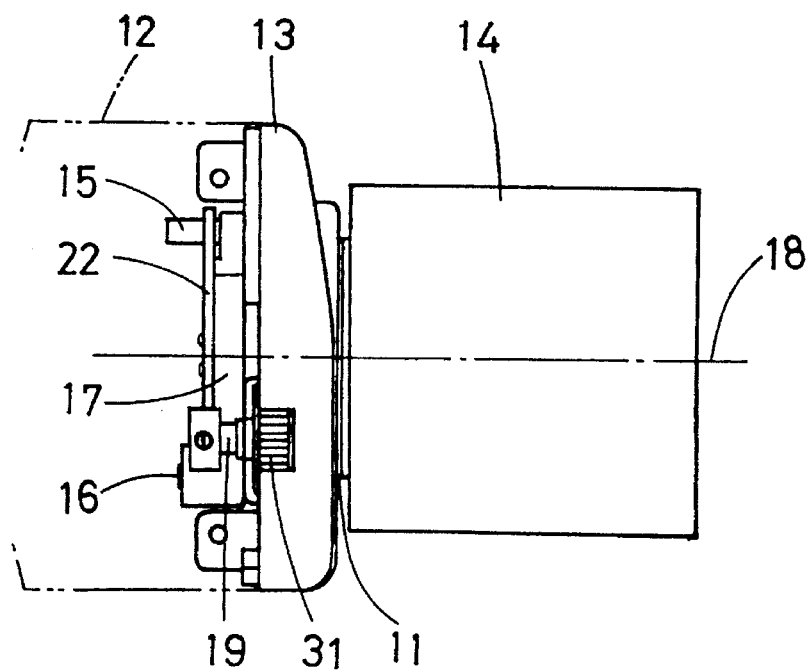
FIG. 2 is a side view showing the back-focus adjusting device.
Figure 3:
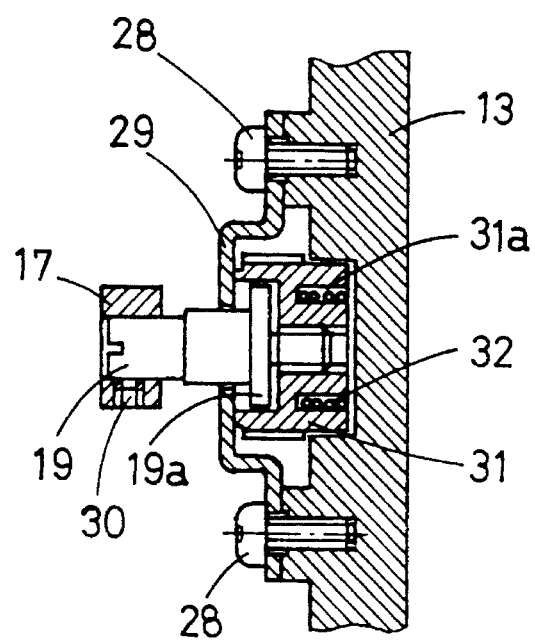
FIG. 3 is a cross sectional view showing a principal part of the back-focus adjusting device.

Referring to FIG. 1 and FIG. 2, there is shown a back-focus adjusting device 10 for a video camera according to a preferred embodiment of the present invention. FIG. 3 shows an enlarged principal part of the device 10. The device 10 comprises two guide pins 15 and 16 and a carrier 17. The guide pins 15 and 16 are fixed inside a front panel 13 of a camera body 12 parallel to an optical axis 18 of a lens 14, said front panel 13 having a lens mount 11 fixed therein. The carrier 17 is assembled slidably on the guide pins 15 and 16.

The guide pins 15 and 16 and the lens mount 11 are made of metal, while the front panel 13 is made of plastics. Each one end of the guide pins 15 and 16 and the lens mount 11 are securely attached by an insert moulding in the front panel 13. The guide pins 15 and 16 are arranged on the front panel 13 symmetric with respect to the optical axis 18 of the lens 14.

The carrier 17, which is made of metal, has a rectangular opening 17a in center thereof, a hole 17b at an upper corner thereof, a hole 17c at a lower corner thereof, and a hole 17d next to the hole 17c, said hole 17b in which the guide pin 15 is to be fitted, said hole 17c in which the guide pin 16 is to be fitted, and said hole 17d in which a screw shaft 19 (described later) is to be fitted. The guide pin 16 and the hole 17c are formed with such an accuracy that the guide pin 16 can be fitted in the hole 17c within a specified tolerance. The hole 17b is formed into a slot so that the guide pin 15 can be easily fitted in the hole 17b.

A coil spring 20 is attached to the guide pin 16. The coil spring 20 biases the carrier 17 assembled on the guide pins 15 and 16 in such a direction that the carrier 17 separates from the lens mount 11. On a back of the carrier 17 circuit board 22 is fixed with machine screws 23, said circuit board 22 in which an image pickup element 21 is securely provided. The image pickup element 21 projects from a surface of the carrier 17 through the opening 17a. On the surface of the carrier 17 a cover 26 made of plastics is fixed with machine screws 27, said cover 26 for mounting a filter 25 made of crystal on the image pickup element 21 via a seat plate 24. Inside the front panel 13a holder 29 made of metal is fixed with machine screws 28. On the holder 29 the screw shaft 19 is assembled in such a manner as to rotate and move back and forth parallel to the optical axis 18 of the lens 14. The screw shaft 19 has a flange 19a, said flange 19a which prevents the screw shaft 19 from slipping out from a hole 29a provided at a center of the holder 29. An end of the screw shaft 19 is inserted into the hole 17d of the carrier 17 and connected to the carrier 17 with set screws 30, while the other end of the screw shaft 19 has a knurled ring 31 rotatably screwed thereon. The ring 31 is rotatably fitted in a circular recess 13a provided inside the front panel 13. The ring 31 is prevented from slipping out from the screw shaft 19 by the holder 29. On a side of the front panel 13 an opening 13b is formed next to the recess 13a. Through the opening 13b a finger or a tool can be inserted into the camera body 12 to rotate the ring 31.

The ring 31 has an annular groove 31a, on which a coil spring 32 is inserted. The coil spring 32 biases the ring 31 toward the holder. As a result, a gap is formed between an end of the ring 31 and a bottom of the recess 13a, the other end of the ring 31 being biased on the holder 29.

According to the above-mentioned structure of the device of the present invention, when the ring 31 is rotated by a finger or a tool being inserted in the camera body 12 through the opening 13b, the screw shaft 19 moves back and forth, so that the carrier 17 moves parallel to the optical axis 18 of the lens 14 along the guide pins 15 and 16. As a result, a change occurs in The distance between a lens mounting surface of the lens mount 11 and the image pickup element 21 fixed to the carrier 17. The ring 31 is biased by the coil spring 32, so that the screw shaft 19 moves back and forth without rattling along the optical axis 18 according to a rotation amount of the ring 31. The carrier 17, which is also biased by the coil spring 20, moves back and forth without rattling along the optical axis 18.

According to the present embodiment of the present invention, the ring 31 can be rotated by a finger or a tool being inserted via the opening 13b from outside the camera body 12, so that the distance between the lens mounting surface of the lens mount 11 and the image pickup element 21 can be set for a back-focus of the lens 14. Thus, it is easy to adjust a back-focus of the lens even when exchanging a lens of a video surveillance camera installed at a corner of a ceiling or the like.

Also, according to the present embodiment, the lens mount 11 and the guide pins 15 and 16 are fixed in the front panel 13 of the camera body 12 by an insert moulding. Thus, a structure of the front panel 13 of the camera body 12 becomes simple, and the lens mount 11 and the guide pins 15 and 16 need not be assembled on the front panel 13 of the camera body 12. As a result, a manufacturing cost of a video camera can be sharply reduced.

Further, according to the present embodiment the guide pins 15 and 16 are arranged on the front panel 13 symmetric with respect to the optical axis 18 of the lens 14. Thus, the carrier 17 fixed to the image pickup element 21 can be supported on the front panel 13 of the camera body 12 with such a high accuracy that the carrier 17 can move back and forth right parallel to the optical axis 18 of the lens 14.

While the invention has been particularly shown and described with reference to preferred embodiments thereof, it will be understood by those skilled in the art that the foregoing and other changes in from and details can be made therein without departing from the spirit and scope of the invention.

What is claimed is:

1. A back-focus adjusting device for a video camera, said device comprising:

two guide pins fixed inside a front panel of a camera body parallel to an optical axis of a lens, said front panel which a lens mount is fixed in, a carrier supported in the camera body by the two guide pins to move parallel to the optical axis, said carrier to which an image pickup element is fixed, a spring provided between the carrier and the front panel of the camera body to bias the carrier in such a direction that the carrier separates from the lens mount, a screw shaft rotatably assembled on the camera body by a holder to move parallel to the optical axis of the lens, said screw shaft having one end connected with the carrier and the other end on which an adjusting ring is screwed, said adjusting ring which is rotatable and prevented from slipping out from the screw shaft by the holder, and an opening formed in the camera body, said opening through which the adjusting ring can be operated from outside the camera body.

2. The device according to claim 1, wherein a spring is provided to bias the adjusting ring toward the holder.

3. The device according to claim 1, wherein the lens mount is securely attached inside the front panel of the camera body by an insert moulding.

4. The device according to claim 1, wherein each one end of the both guide pins are securely attached inside the front panel of the camera body by an insert moulding.

5. The device according to claim 1, wherein the both guide pins are arranged symmetric with respect to the optical axis of the image input lens.

* * * * *